United States Patent [19]

Dudynskyj

[11] 4,124,099
[45] Nov. 7, 1978

[54] WHEELCHAIR LIFT DEVICE

[75] Inventor: Peter P. Dudynskyj, Metamora, Mich.

[73] Assignee: General Motors Corporation, Detroit, Mich.

[21] Appl. No.: 839,428

[22] Filed: Oct. 4, 1977

[51] Int. Cl.² .................... B60P 1/44; B60R 3/02
[52] U.S. Cl. .................... 187/9 R; 214/75 R; 280/166
[58] Field of Search .................. 187/1 R, 9 R, 10; 214/75 R, 75 H, 75 G, 75 T; 280/166; 296/62; 105/443, 447, 449

[56] References Cited

U.S. PATENT DOCUMENTS

| 3,368,704 | 2/1968 | Pope | 214/75 R |
|---|---|---|---|
| 3,408,959 | 11/1968 | Cripe et al. | 105/447 |
| 3,478,904 | 11/1969 | Courter | 214/75 R |
| 4,027,807 | 6/1977 | Thorley | 214/75 R |
| 4,029,223 | 6/1977 | Adamski et al. | 214/77 R |

Primary Examiner—Evon C. Blunk
Assistant Examiner—Jeffrey V. Nase
Attorney, Agent, or Firm—Edward J. Biskup

[57] ABSTRACT

A wheelchair lift device including a platform located in the stepwell of a motorcoach for raising and lowering a wheelchair between a first position wherein the platform is in horizontal alignment with an elevated floor formed with the motorcoach and a second position wherein the platform is at ground level. The device includes foldable hinged sections that are positioned through a linkage and a rotatable arm to form steps for use by able-bodied persons and are extendible laterally outwardly relative to the stepwell so as to align the hinged sections along a horizontal plane and thereby form the platform for supporting the wheelchair.

3 Claims, 7 Drawing Figures

WHEELCHAIR LIFT DEVICE

This invention concerns elevator devices in general and more particularly a wheelchair lift device that can be used with a motor vehicle.

Co-pending patent application Ser. No. 839,320 filed Oct. 4, 1977, entitled "Wheelchair Lift Device" in the names of Peter Dudynskyj, Daniel Kline and James Hogan and assigned to the assignee of this invention discloses a lift device for use in a motorcoach that employs a parallelogram type linkage actuated by an expendable hydraulic cylinder for converting a foldable step assembly into a horizontal support platform for wheelchair use. Linkages connected to a carriage that is movable through a chain drive to positions which selectively locate the deployed platform at the floor level of the motorcoach and at ground level so that a handicapped person in a wheelchair can gain entry and exit from the motorcoach.

The present invention concerns an improved wheelchair lift device of the type described above but differs therefrom in that the direct chain drive for moving the carriage is replaced by a rotatable arm that serves to move the support platform in an arc between the floor and ground level positions. In one form, the wheelchair lift device according to the invention includes a pair of substantially vertically oriented guide bars secured to the body of the vehicle on the opposite sides of the doorway that opens into a stepwell leading into the interior of the vehicle. A carriage is mounted on each of the guide bars for movement therealong to three positions. A parallelogram linkage including a pair of substantially vertically oriented links connects each of the carriages with a platform assembly which includes a plurality of hinged sections. Two of the hinged sections normally form a stairway providing a thread and riser when the carriage is in one of the three positions while another two of the hinged sections form a horizontal platform when the carriage is located in the other two positions. The linkage is combined with a power-operated rotatable arm one end of which is pivotally connected to the vehicle and the other end is pivotally connected to and supports the hinged sections. The arrangement of the carriage, the links and the hinged sections is such that when the power-operated arm is pivoted from a horizontal position to a raised vertical position, the hinged sections move laterally outwardly relative to the doorway under the control of the linkage and cause the platform assembly to be formed into a horizontal support in line with the vehicle floor. After the platform assembly is deployed, the arm then is pivotally movable to a lowered position so as to place the wheelchair support platform at ground level.

In another form of the invention, the parallelogram linkage and the carriage are replaced with a planetary gear system that is combined with the arm which serves to move the hinged sections from the normal folded position to the raised vehicle floor level position and the lowered ground level position.

The objects of the present invention are to provide a new and improved wheelchair lift device for a motor vehicle having a movable carriage which through a rotatable support arm and a pair of generally vertically oriented link members supports a plurality of hinged sections that normally form a series of steps and by raising the arm from a horizontal position to a vertical position, the steps can be converted into a horizontal platform for supporting a wheelchair under the control of the link members, to provide a new and improved wheelchair elevator that can be incorporated in the stepwell of a bus and that includes a plurality of hinged angularly related members which normally form a series of steps and are movable by a rotatable arm laterally outwardly relative to the stepwell under the control of a parallelogram linkage so as to cause the hinged members to be horizontally aligned and form a platform for supporting a wheelchair; to provide a new and improved wheelchair lift device for the stepwell of a bus that has a plurality of link members for controlling movement of a plurality of hinged sections which through the rotation of a support arm are connected to the hinged sections are alternately formed into stairs for able-bodied persons and into a horizontal support platform for a physically handicapped person using a wheelchair; to provide a new and improved wheelchair lift device that can be located in the stepwell opening of a bus and has foldable hinged sections that are positioned through a rotatable arm and a planetary gear system to form steps and are extendible laterally outwardly relative to the opening by the upward pivotal movement of the arm so as to align the hinged sections along a horizontal axis and thereby form a support platform for a wheelchair.

Other objects and advantages of the invention will be more apparent from the following details description when taken with the drawings in which.

Figure 1:
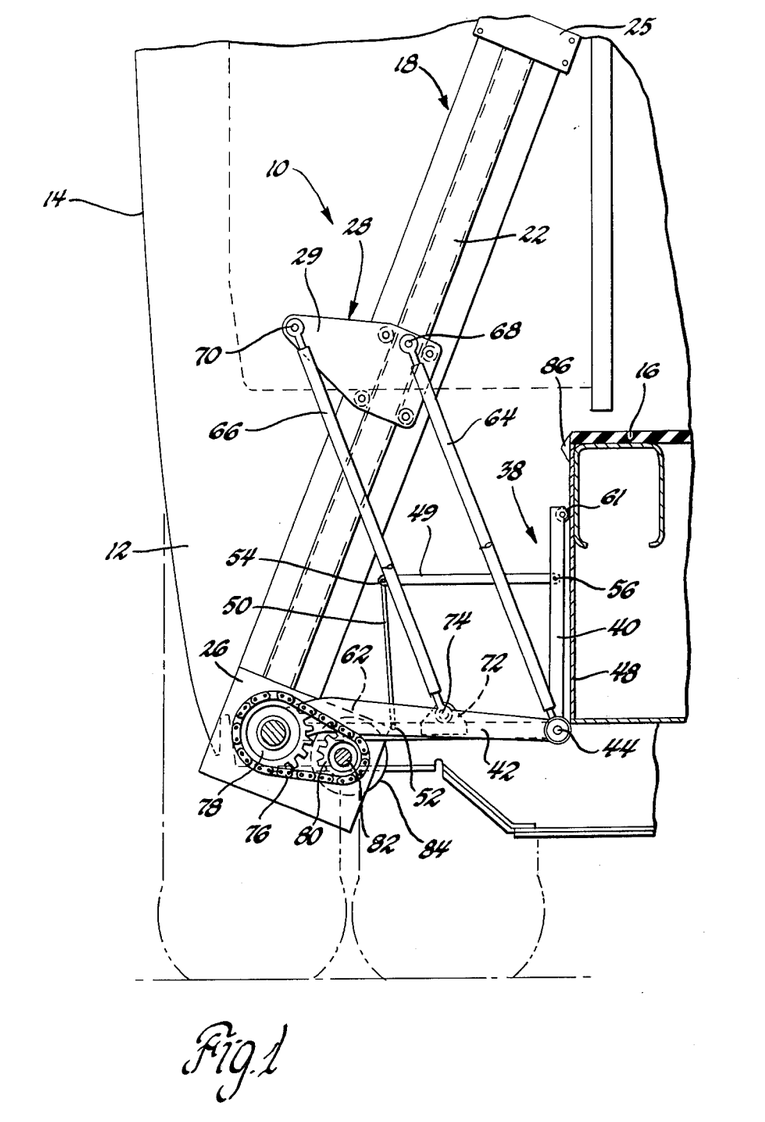
FIG. 1 is a side elevational view showing a wheelchair lift device made in accordance with the invention and located in the stepwell of a motorcoach in the normal folded position.
Figure 2:
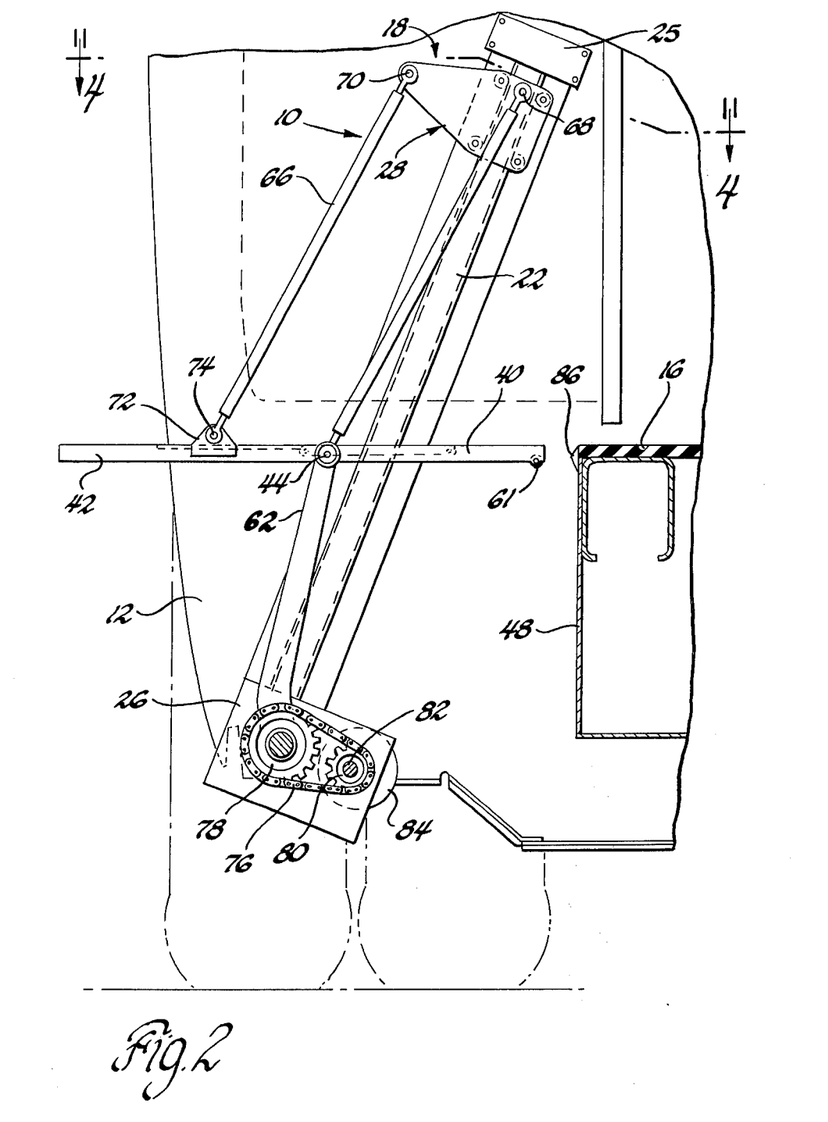
FIG. 2 is an elevational view showing the wheelchair lift device of FIG. 1 with the platform thereof being deployed in a horizontal plane in line with the floor of the motorcoach.
Figure 4:
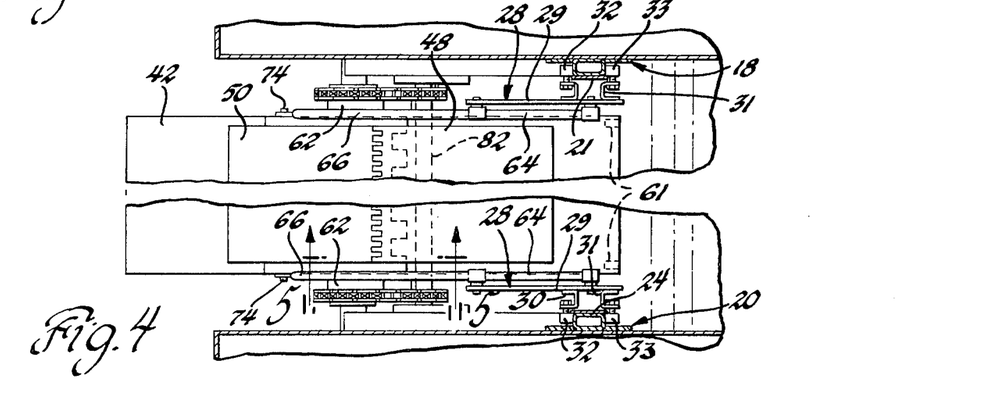
FIG. 4 is a plane view of the wheelchair lift device taken on line 4—4 of FIG. 2.

Referring to the drawing and more particularly FIGS. 1, 2 and 4 thereof, a wheelchair lift device 10 made in accordance with the invention is shown positioned within the stepwell 12 of a motor vehicle 14 such as a coach or bus of the type used in mass public transit having the usual floor 16 which is at an elevation substantially above ground level. As will be more apparent as the description of the invention proceeds, the wheelchair lift device 10 provides the usual two steps in the stepwell 12 of the vehicle permitting normal entry and exit for able-bodied passengers. In addition, and when it is desired, the steps of the wheelchair device 10 can be converted through a rotatable arm into a horizontal support for a wheelchair that can be moved between an aligned position with the vehicle floor 16 and a ground level position. In this manner, a physically handicapped person confined to a wheelchair can be served by the vehicle 14.

More specifically, the wheelchair lift device 10 comprises a pair of identical frame members 18 and 20 spaced along an axis parallel to the longitudinal axis of the vehicle 14 and located in the stepwell 12 and on the opposite sides thereof. The frame members 18 and 20 are secured in substantially vertical positions to the associated frame structure of the vehicle 14 and respectively include identical guide bars 22 and 24 each of which is secured at the upper and lower ends to "U" shaped brackets 25 and 26. As seen in FIG. 4, each of the guide bars 22 and 24 has parallel side walls along its full length when viewed in cross section. The side walls of each guide bar provide a track for supporting a carriage 28 that is movable along the associated guide bar. In this connection, it will be noted that each carriage 28 includes a housing comprising a support plate 29 rigidly formed with a pair of brackets 30 and 31. An upper pair of rollers 32 and 33 and a lower pair of rollers 34 and 35 are mounted on the brackets 30 and 31 of each carriage 28. The rollers engage the flat side walls of the associated guide bar and allow each carriage to move freely upwardly and downwardly between the positions shown in FIGS. 1, 2 and 3.

Figure 5:
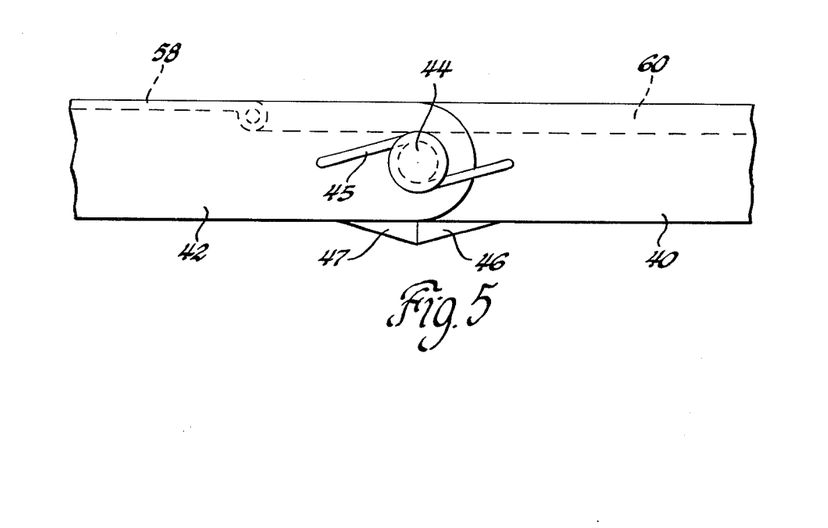
FIG. 5 is an enlarged view taken on lines 5—5 of FIG. 4.

It will be noted that the aforementioned steps form a part of the platform 38 which is located in the stepwell 12 and consists of a plurality of hinged sections that extend between the guide bars 22 and 24 as seen in FIG. 4. As best seen in FIG. 1, the platform 38 includes a pair of planar base sections 40 and 42 which are pivotally interconnected at their inner ends by a pivotal connection 44 for movement about a horizontal axis that is substantially parallel to the longitudinal axis of the vehicle. As seen in FIG. 5, a torsion spring 45 is wound about the pin which interconnects the base sections 40 and 42 and constitutes the pivotal connection 44. One leg of the spring 45 is fixed with the base section 40 and the other leg is fixed with the base section 42. The spring 45 continuously biases the base sections to the aligned position of FIGS. 2, 4 and 5, and stops members 46 and 47 respectively fixed with the base sections 40 and 42, serve to assure that the base sections stay in the aligned position.

The platform 38 is shown in the collapsed or folded position in FIG. 1 wherein it is disposed adjacent to a vertical back wall 48 formed rigidly with the body of the vehicle 14. In the folded position, the base section 40 is located in a vertical plane adjacent back wall 48 while the base section 42 is located in a horizontal plane. The base sections 40 and 42 support a planar tread member 49 and a planar riser member 50 that constitute additional hinged sections of the platform extending between the guide bars 22 and 24. The riser member 50 has one end connected by a pivotal connection 52 to the base section 42 intermediate the ends thereof. The other end of the riser member 50 is connected to one end of the tread member 49 by a piano hinge that provides a pivotal connection 54. The other end of the tread member 49 is connected to the base section 40 by a pivotal connection 56 adjacent the outer end of the base section 40. The base section 42, between the pivotal connections 52 and 44, and the base section 40, between pivotal connections 44 and 56, are respectively formed with wells 58 and 60 having a depth, width and a longitudinal length that suitably accommodates the thickness, width and longitudinal length of the associated tread and riser members 49 and 50 so as to allow storage of the latter when the platform 38 is deployed to the extended or unfolded position shown in FIGS. 2 and 4. In addition, base section 40 is provided with a roller 61 which contacts the back wall 48 when the platform 38 is in the position of FIG. 1.

The deployment of the platform 38 to the unfolded position of FIGS. 2 and 4 is realized through the rotational movement of a support arm 62 while under the control of a linkage incorporated with each of the carriages 28. The linkage includes parallel support link members 64 and 66. As seen in FIG. 1, the link members 64 and 66 are substantially vertically oriented, and are carried by the carriage 28. The link member 64 has the upper portion thereof pivotally connected to the carriage 28 by a pivotal connection 68 while the lower end is pivotally connected to the inboard end of the base section 42 by the pivotal connection 44 which also connects the base section 42 to the base section 40. The link member 66 has its upper end pivotally connected to the carriage 28 by a pivotal connection 70. The lower end of the link member 66 is connected to the base section 42 through a bracket 72 located intermediate the inboard and outboard ends of base section 42 and by a pivotal connection 74.

Figure 3:
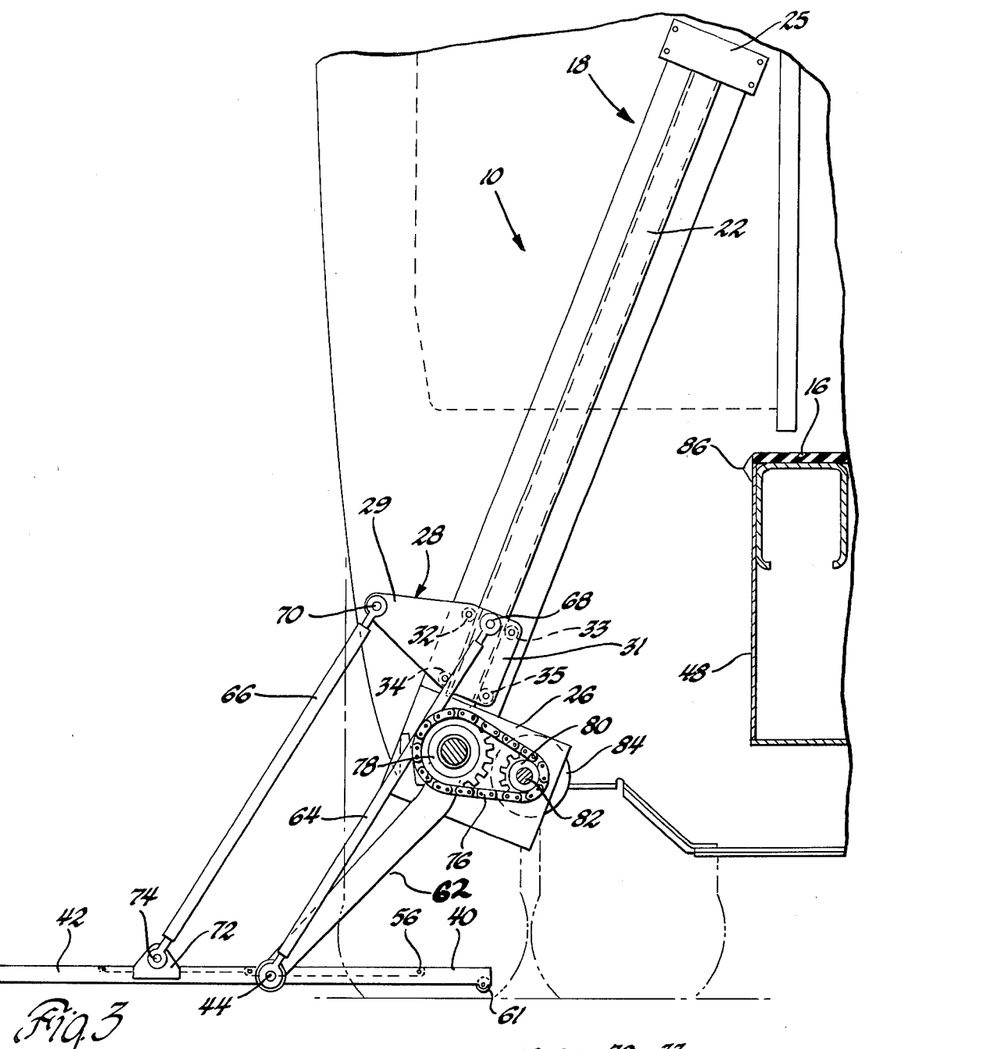
FIG. 3 is a view of the wheelchair lift device similar to that shown in FIG. 2 with the platform being positioned at ground level.

A chain drive, which includes an endless chain 76 and a pair of rotatable sprockets 78 and 80 carried by bracket 26, is incorporated with the lower end of each of the frame members 18 and 20 for moving the arm 62 from the horizontal position of FIG. 1 to the raised vertical position of FIG. 2 and the lowered vertical position of FIG. 3. It will be noted that the sprocket 80 of the frame members 18 and 20 are drivingly interconnected by a common shaft 82 which extends between the frame members and is driven by a reversible hydraulic rotary motor 84. The sprocket 78 is rigidly connected with the arm 62 so upon rotational drive being directed to sprocket 78, the arms 62 associated with the frame members 18 and 20 are movable together from the normal position of FIG. 1 to either the raised position of FIG. 2 and then to the lowered position of FIG. 3. During such movement, the platform 38 under the control of the linkage connected to the carriages 28 is moved as a unit between the latter mentioned positions.

From the above description, it should be apparent that when the wheelchair lift device 10 has the parts thereof located in the normal position as seen in FIG. 1, the tread and riser members 49 and 50 are disposed in substantially mutually perpendicular planes so as to form the riser and tread portions of one step while the outboard end of the base section 42 forms the tread portion of a second step. Thus, an able-bodied person can gain entrance into the vehicle 14 by first stepping on the outer end of the base section 42 and then on the tread member 49 and finally on the floor 16 of the vehicle. If, however, a physically handicapped person in a wheelchair should wish to enter the vehicle 14, the vehicle operator actuates a control valve of a suitable hydraulic control system (not shown) that directs pressurized fluid to the hydraulic rotary motor 84. This causes the shaft 82 to drive the sprocket 80 of each of the frame members 18 and 20 in a counterclockwise direction with similar driving rotation of the sprocket 78. This, in turn, results in counterclockwise rotation of the arm 62 from the FIG. 1 position to the FIG. 2 position. Although not shown, suitable means can be positioned on the vehicle body 14 that would be engaged by a portion of the arm 62 as it reaches the position of FIG. 2 to automatically discontinue flow of pressurized fluid to the motor 84. As the arm 62 rotates in this manner, it carries the base section 42 outwardly relative to the stepwell 12 under the control of the link members 64 and 66 with the carriage 28 being moved upwardly along the associated guide bar. This movement of the arm 62 continues until the base sections 40 and 42 are horizontally aligned as seen in FIG. 2. In this connection, as the arm 62 raises the base sections 40 and 42, the roller 61 moves along the back wall 48 under the influence of the spring 45 and contacts the lower inclined surface of a ramp member 86. As the arm 62 continues its movement towards the FIG. 2 position, the clockwise rotation of the base section 40 by the spring 45 causes the tread and riser members 49 and 50 to move towards their stored positions in the wells 58 and 60. Also, during such time, the base section 42 is maintained in a horizontal position by the link members 64 and 66 as the carriage 28 is moved upwardly along the associated guide bar. When the arm 62 reaches the FIG. 2 position, the platform 38 is fully deployed to form a horizontal support surface for the wheelchair. It will be noted that although, not shown, suitable means can be provided on the vehicle body 14 that would be engaged by a portion of the arm 62 when it reaches the position of FIG. 2 so as to automatically discontinue flow of pressurized fluid to the motor 84. On the other hand, the automatic stop of the motor 84 can be overridden by the operator maintaining the control valve in an "on" position so as to cause the arm 62 to continue to rotate from the FIG. 2 position to the FIG. 3 position. As the arm 62 moves between the latter mentioned positions, the carriages 28 move downwardly along the associated guide bars and continue to maintain the platform 38 in a horizontal attitude. Once the arm 62 reaches the position of FIG. 3, the platform 38 is at ground level and the flow of pressurized fluid to the motor 84 can be automatically discontinued as described above. The wheelchair can then be rolled onto the platform 38 and locked into position. The vehicle operator then reverses the procedure, causing the drive sprockets 78 and 80 to be driven in a clockwise direction resulting in the arms 62 synchronously rotating in a clockwise direction to raise the carriages 28 and the platform 38 upwardly to the FIG. 2 raised position wherein the platform 38 is horizontally aligned with the floor 16. Again, the motor 84 can be either manually or automatically stopped and the wheelchair then can be rolled onto the floor 16. Afterwards, the motor 84 can again be energized to return the arm 62 and platform 38 to the folded position of FIG. 1. It will be noted that as the platform moves from the FIG. 2 position to the FIG. 1 position, the roller 61 will contact the upper inclined surface on the range member 86 to initiate the counterclockwise rotation of the base section 40 about pivotal connection 44 to return the various parts of the platform 38 to the folded position of FIG. 1 wherein the steps are formed for normal usage of the vehicle entrance.

Although not shown, it will be understood that the outer end of the base section 42 can be provided with a tapered ramp portion so as to facilitate rolling of the wheelchair onto the platform 38 when the latter is in the ground level position of FIG. 3. Also, in order to eliminate the possibility of an over-center action that could prevent the tread and rise members 49 and 50 from properly returning to the step forming position of FIG. 1 after they are located in the aligned position of FIG. 2, the tread and riser members 49 and 50 can be sized so that the center of the piano hinge or pivotal connection 54 is slightly above a horizontal plane passing through the centers of pivotal connections 52 and 56 when the platform 38 is in the FIG. 2 position. Another manner of accomplishing the same result would be to incorporate a spring at the pivotal connection 54 which would continuously bias the tread and riser members 49 and 50 towards the step forming position of FIG. 1.

Figure 6:
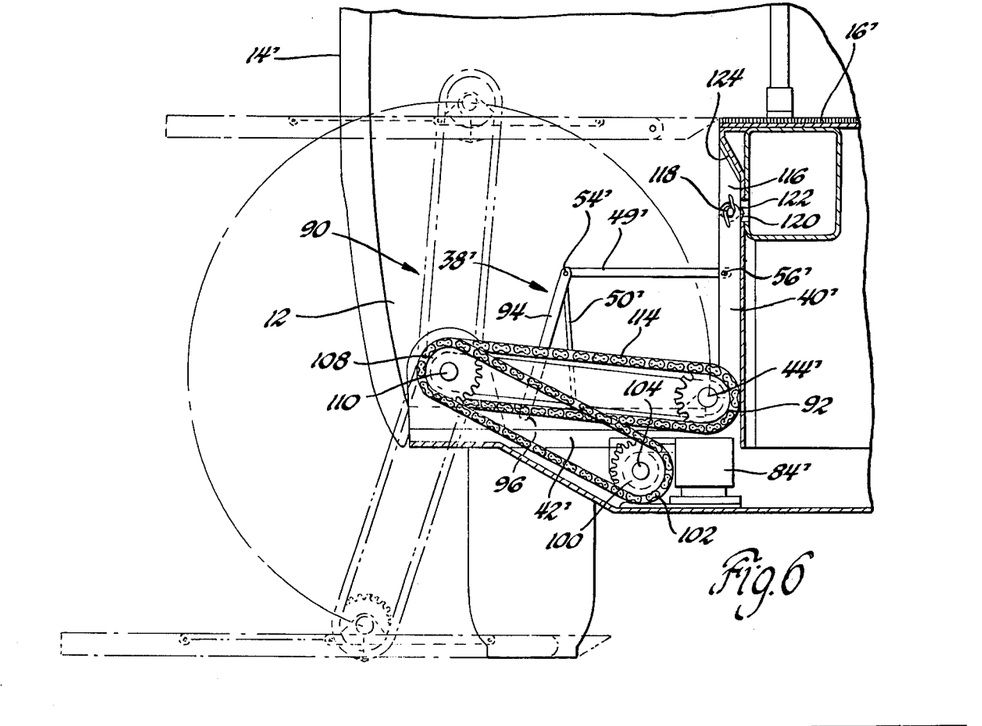
FIG. 6 is a side elevational view of a modified form of the wheelchair lift device.
Figure 7:
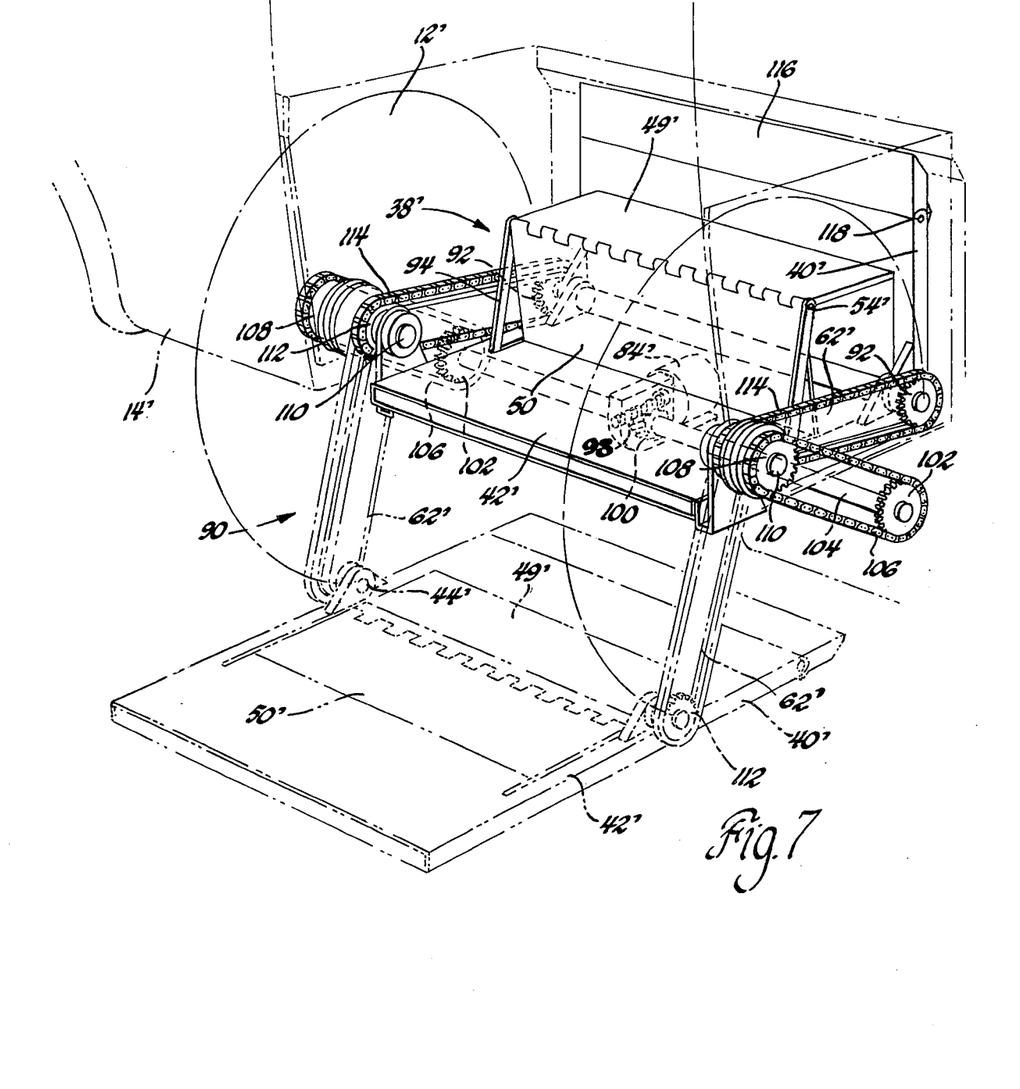
FIG. 7 is a perspective view of the wheelchair lift device of FIG. 6.

FIGS. 6 and 7 show another form of the invention disclosed in FIGS. 1-5, and it will be noted that parts of the FIGS. 6 and 7 construction corresponding to the parts in the above-described wheelchair lift device 10 are identified by the same reference numerals but primed.

As seen in FIGS. 6 and 7, the wheelchair lift device is generally indicated by the reference numeral 90 and, as in the case with wheelchair lift device 10, includes a pair of identical operating mechanisms positioned on the opposite sides of a stepwell 12' that provides entrance to the interior of the motorcoach vehicle 14'. Also, each of the operating mechanisms comprises a support arm 62', the outboard end of which is mounted to the body of the vehicle 14' for rotation about a horizontal axis extending longitudinally of the vehicle. The other end of the arm 62' is connected to the inboard end of base section 42' of the platform 38' by a pivotal connection 44' which also serves to pivotally interconnect the base section 42' to the base section 40'. In addition, a sprocket wheel 92 is nonrotatably fixed to the base section 42' with its center located at the center of the pivotal connection 44'.

The platform 38' also includes a tread member 49', one end of which is connected to the base section 40' by a pivotal connection 56' while the other end is connected to a riser member 50' by a pivotal connection 54'. It will be noted that as seen in FIG. 6, the lower end of the riser member 50' is spaced from and not connected to the base section 42'. Instead, a link 94 is provided which has one end pivotally connected to the base section 42' by a pivotal connection 96 while the other end is pivotally connected to the tread and riser members by the pivotal connection 54'. Both base sections 40' and 42' have wells 58' and 60' located in the upper surfaces there of for accomodating the tread and riser members 49' and 50' in a manner as explained with respect to the corresponding parts in the wheelchair lift device 10. Also, although not shown, a torsion spring is provided at the pivotal connection 44' for continuously providing a clockwise bias to the base section 40' about the pivotal connection 44' in the manner explained with respect to wheelchair lift devoce 10.

The drive system for the wheelchair lift device 90 includes a reversible rotary hydraulic motor 84' carried by the vehicle body and having the output shaft thereof formed with a worm 98. The worm meshes with a worm gear 100 which is rigidly fixed with a sprocket wheel 102 mounted on a shaft 104 that is carried by the vehicle and extends from one side of the stepwell 12 to the other for rigid connection with an identical sprocket wheel 102. An endless chain 106 connects the sprocket wheel 102 with a sprocket wheel 108 fixed with a stub shaft 110 which is rotatably carried by the body of the vehicle 14. It will be noted that the shaft 110 extends through a sprocket wheel 112 which is fixed with the body of the vehicle and is connected to the sprocket wheel 92 by an endless chain 114. The sprocket wheels 92 and 112 are identical in size and serve to provide a planetary gear system for the wheelchair lift device 90 as will be explained hereinafter. One further difference in the wheelchair lift device 90 over the wheelchair lift device 10 is that the base section 40' is provided with an extension member 116 which is pivotally connected to the end of the base section 40' by a pivotal connection 118. Although not shown, a torsion spring is provided at the pivotal connection 118 for continuously urging the extension member 116 into alignment with the base section 40'. A pair of stop members 120 and 122 serve to maintain the extension member 116 in alignment with the base section 40'.

As seen in full lines in FIGS. 6 and 7, the wheelchair lift device 90 is in the collapsed or folded position. When it is desired to deploy the platform 38', the vehicle operator actuates a control valve of a suitable hydraulic control system (not shown) that directs pressurized hydraulic fluid to the hydraulic rotary motor 84'. The worm 98 then drives the sprocket wheels 102 in a counterclockwise direction through the worm gear 100. Similar rotation is directed to the sprocket wheels 108 which through the stub shafts 110 cause the arms 62' to synchronously rotate counterclockwise towards the raised position indicated by Roman numeral I. As the arms 62' move towards the raised position, the extension member 116 is initially cammed counterclockwise about the pivotal connection 118 by the camming surface 124 attached to the floor 16'. As the platform 38' continues its upward movement, the torsion spring at the pivotal connection 44' causes the base section 40' to rotate in a clockwise direction about pivotal connection 44' thereby causing the tread member 49' and the riser member 50' to move towards and into the wells 58' and 60' under control of the links 94 when the arms 62' reach the fully raised position indicated by the Roman numeral I. During such movement, the base section 42' maintains a horizontal attitude at all times. This is so because sprocket wheel 112 is fixed with the body of the wheel and therefore does not rotate. Similarly, sprocket wheel 92 is fixed to the inboard end of the base section 42' and does not rotate relative thereto. Accordingly, when the arm 62' rotates about its support, the chain 114 causes a planetary action which results in the base section 42' maintaining the horizontal position as it moves upwardly to the raised floor level position. A similar action occurs when the arms 62' are rotated counterclockwise from the raised position to the lowered ground level position indicated by the Roman numeral II. Once the platform 38 is at the ground level position, a wheelchair can be rolled onto the aligned base sections 40' and 42' and the vehicle then reverses the procedure causing the drive sprocket wheel 102 to be driven in a clockwise direction thereby raising the arms 62' and the platform 38 in an arc to the raised floor level position so the wheelchair can be rolled onto the vehicle floor 16'. Afterwards, the arms 62' are returned to the full line position so the platform 38' can once again be used for normal stairway entry to the motorcoach.

As in the case with the wheelchair lift device 10, the control system for operating the hydraulic motor 84' can include automatic stop means for locating the arms 62' in the raised floor level position and the lowered ground level position.

Various changes and modifications can be made to this construction without departing from the spirit of the invention. Such changes and modifications are contemplated by the inventor and he does not wish to be limited except by the scope of the appended claims.

What is claimed is:

1. A lift device having a foldable platform located in the doorway of a motor vehicle for raising and lowering a load between a first position wherein the platform is in horizontal alignment with a floor formed with the motor vehicle and a second position wherein the platform is at ground level, said device comprising a pair of arms mounted to said vehicle at the opposite sides of said doorway, means connecting one end of each of said arms to said vehicle for rotation about a first horizontal axis, pivot means connecting the other end of each of said arms to said platform, a first sprocket wheel fixed with said vehicle adjacent said one end of each of said arms and a second sprocket wheel fixed with said platform adjacent said pivot means; a chain entrained about said first and second sprocket wheels for controlling movement of said platform and for maintaining said platform in a horizontal attitude as it is moved between said first and second position, said platform comprising a pair of base sections and a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a horizontal axis, a second pivot connection joining said tread section and said riser section for pivotal movement about an axis parallel to said horizontal axis, third and fourth pivot connections joining said riser section and said tread sections to said base sections whereby said riser and tread sections are movable by said base sections between said step forming position and said load support position, and motor means operatively connected to said one end of each of said arms for rotating the latter in an arc whereby the platform is moved from said step forming position to said first and second positions.

2. A lift device having a foldable platform located in the doorway of a motor vehicle for raising and lowering a load between a first position wherein the platform is in horizontal alignment with a floor formed with the motor vehicle and a second position wherein the platform is at ground level, said device comprising a pair of arms mounted to said vehicle at the opposite sides of said doorway for rotation about a first horizontal axis, a first sprocket wheel having the center thereof positioned along said first horizontal axis and fixedly secured to said vehicle, a second sprocket wheel spaced from said first sprocket wheel and rigidly secured to said platform, pivot means connecting the free ends of said arms to said platform in axial alignment with said second sprocket wheel, a chain entrained about said first and second sprocket wheels for controlling movement of said platform and for maintaining said platform in a horizontal attitude as it is moved between said first and second positions, said platform comprising a pair of planar base sections and a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a second horizontal axis, spring means located at said first pivot connection and continuously urging said base sections towards the load support position, a second pivot connection joining said tread section and said riser section for pivotal movement about an axis parallel to said second horizontal axis, third and fourth pivot connections including a link joining said riser section and said tread sections to said base sections whereby said riser and tread sections are movable by said base sections between said step forming position and said load support position, and motor means operatively connected to said arms for rotating the latter about said first horizontal axis whereby the platform is moved from said step forming position to said first and second positions.

3. A lift device having a foldable platform located in the doorway of a motor vehicle for raising and lowering a load between a first position wherein the platform is in horizontal alignment with an elevated floor formed with the motor vehicle and a second position wherein the platform is at ground level, said device comprising a pair of arms mounted to said vehicle at the opposite sides of said doorway, means connecting one end of each of said arms to said vehicle for rotation about a common axis that is parallel to the longitudinal axis of the vehicle, pivot means connecting the other end of each of said arms to said platform, a first sprocket wheel fixed with said vehicle adjacent said one end of each of said arms and a second sprocket wheel fixed with said platform adjacent said pivot means, a chain entrained about said first and second sprocket wheels for controlling movement of said platform between said first and second positions, said platform comprising a pair of planar base sections and a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a horizontal axis, spring means located at said first pivot connection and continuously urging said base sections towards the load support position, a second pivot connection joining said tread section and said riser section for pivotal movement about an axis parallel to said horizontal axis, a third pivot connection joining said tread section to one of said base sections, a link pivotally connected to the other of said base sections at one end and having the other end pivotally connected to said tread section at said second pivot connection whereby said riser and tread sections are movable by said base sections between said step forming position and said load support position, and a rotary hydraulic motor operatively connected to said arms for rotating the latter about said common axis whereby the platform is moved from said step forming position to said first and second positions.

* * * * *